Figure 1:
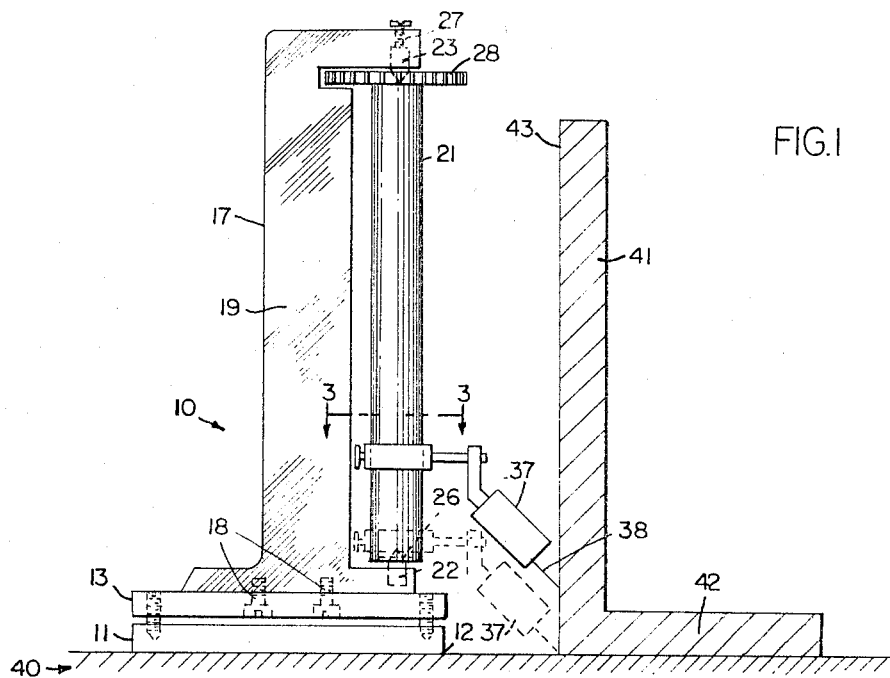

Sept. 13, 1966  V. J. FOSCAROTA  3,271,871

TESTING INSTRUMENT

Filed Feb. 16, 1965

INVENTOR
VALENTINO J. FOSCAROTA
BY,
Wolf, Greenfield & Hieken
ATTORNEYS

United States Patent Office

3,271,871
Patented Sept. 13, 1966

3,271,871
TESTING INSTRUMENT
Valentino J. Foscarota, 25 Cleveland St., Somerville, Mass.
Filed Feb. 16, 1965, Ser. No. 433,047
7 Claims. (Cl. 33—174)

The present invention relates to a testing instrument and more particularly to a novel and improved inclination and flatness gauge which is particularly useful for measuring squareness of surfaces of a work piece and/or flatness of a surface.

In machine work, it is often necessary to test surfaces of a work piece for squareness or perpendicularity with respect to other surfaces of a work piece. It is known to use a try square and a number of other testing instruments for such purposes. Such known testing instruments are often relatively expensive, difficult to use and often require the use of a master square or master angle iron for self-alignment previous to use. In addition, it has been difficult to obtain testing instruments which are useful to check the flatness of a surface without direct reference to a known flat surface.

An important object of this invention is to provide a novel and improved inclination and flatness testing instrument, which is relatively simply constructed, yet, highly accurate.

Another important object of this invention is to provide a testing instrument in accordance with the preceding object which is itself a master tram and can be adjusted without the use of a master square or master angle iron.

Still another important object of this invention is to provide a testing instrument in accordance with the preceding object which is particularly useful for testing the flatness of large surfaces without constant reference to other surfaces of a work piece or guide.

According to the invention the testing instrument is a squareness and flatness gauge having a substantially vertically extending elongated shaft. A testing means is mounted on the shaft for reciprocal movement there along into selected positions from an uppermost position to a lowermost position. The testing means is also mounted for rotational movement about the axis of the shaft. A testing end of the testing means is constructed and arranged to contact a flat surface on which the gauge can rest for enabling truly vertical alignment of the shaft by rotation through an arc of 180 degrees to align at least three points on the flat surface.

Preferably the inclination and flatness gauge is a squareness gauge having a base defining a lowermost plane with an upwardly extending support mounted on the base. An upwardly extending elongated shaft is in turn mounted on the support and carries testing means mounted for reciprocal movement along the shaft. A means interconnects the base and the support for permitting perpendicular alignment of the shaft with respect to the lowermost plane defined by the base. The testing means is mounted for rotation about an axis of the shaft and has a testing end constructed and arranged to extend to a lower flat surface on which the gauge can be aligned. The testing end is capable of rotating through 180 degrees which enables positioning of at least three points on the flat surface.

In use of the squareness and flatness gauge, it is placed on a flat surface and the testing means is rotated through a 180 degree arc and by three point alignment, the interconnecting means is adjusted until the shaft is perpendicular to the flat surface. The gauge can then be used to test the flatness of any surface without respect to any other surface or by reciprocal movement along the axis of the shaft, the testing means can gauge the squareness or perpendicularity of a surface of a work piece with respect to another surface of the work piece.

Figure 2:
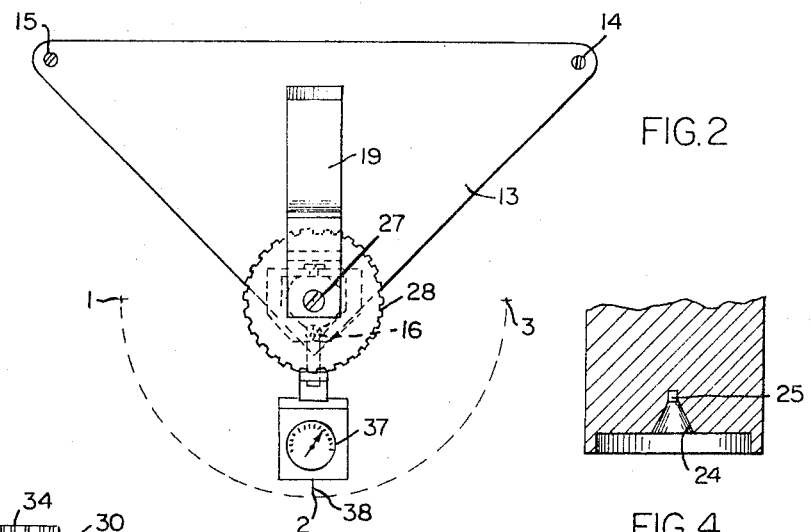
Figure 4:
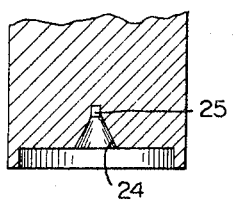
Figure 3:
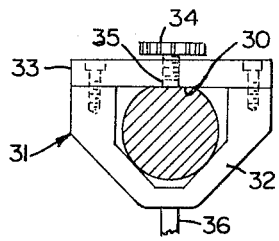

Other objects, features and advantages of this invention will become apparent from the following description, reference being had to the accompanying drawings forming a part of this specification wherein like reference characters designate corresponding parts in the various figures and in which:

FIG. 1 is a front view of a preferred embodiment of this invention;
FIG. 2 is a top plan view thereof;
FIG. 3 is a view partially in sections taken through line 3—3 of FIG. 1; and
FIG. 4 is a fragmentary view of an element of this invention.

With reference now to the drawings and more particularly FIG. 1, a squareness and flatness gauge 10 is illustrated on a flat surface 40, preferably having a triangular base 11 defining a lower flat surface 12. A preferably triangular support plate 13 overlies the base plate 11 and is interconnected therewith by three adjustment screws 14, 15, and 16. The adjustment screws 14, 15, and 16 preferably lie sixty degrees apart about the circumference of a circle through the central point of the base plate 11. Screws 14, 15, and 16 are preferably threadably engaged with suitable holes in support plate 13 and are received in snugly fitting locking holes extending partially through base plate 11. In accordance with conventional practice turning of any of screws 14, 15, or 16 will not cause any movement of base plate 11, but will adjust the position of support plate 13 with respect to the base plate 11. Other leveling devices or adjustment means may be used in places of screws 14, 15, and 16 if desired.

An upstanding support frame 17 is fixed to the support plate 13 preferably by means of lock screws 18 although welding or other conventional joining means can be used. Alternately support plate 13 can be made integral with the upwardly extending support frame 17. Preferably support 17 comprises a C-shaped frame having a vertical section 19. A generally cylindrical shaft 21 is rotatably mounted about its longitudinal axis by bearings 22 and 23. Preferably each end of the shaft 21 is cut out as shown in FIG. 4 to provide a generally conical bearing surface 24 having a circular bore 25 at its center. Circular bores 25 are preferably axially aligned with the central axis of the cylindrical shaft 21. Since the shaft 21 is preferably first formed as a cylinder, it is relatively easy to locate the central axis and align the end bearing surfaces 24 therewith. Bearing block 22 has an upper conical bearing surface 26 slidably mounted within and engaging lower bearing surface 24. A lower end of the bearing block 22 is fixed to an extension of the support frame 17. Upper bearing block 23 is mounted on an upper extension of the support frame 17 by a lock screw 27 threadably engaged in a suitable bore in the support frame. Thus the upper bearing block 23 can be vertically aligned with the lower bearing block and moved axially by the lock screw 27 to firmly hold shaft 21 in position.

A hand gripping handle 28 is provided fixed to the shaft 21 for rotation of the shaft as will be later described. In some cases a conventional locking mechanism may be mounted on the support frame 17 for locking shaft 21 in desired positions.

Preferably the cylindrical shaft 21 has a flat side 30 extending from top to bottom. As best seen in FIG. 3, a testing means 31 is mounted on the shaft 21 for reciprocal movement there-along into desired selective positions. The testing means 31 comprises a C-shaped bracket 32 having a back plate or bar 33 screwed or welded thereto as shown in FIG. 3. Bar 33 has a surface snugly engaging flat surface 30 of the shaft 21. A set screw 34 is provided on the bar 33. Preferably a nylon block 35 is positioned between surface 30 and the end of the set screw 34 so that loosening of set screw 34 allows reciprocal sliding of the testing means along the vertical shaft while tightening of set screw 34 locks the testing means with respect to the shaft 21.

Preferably an arm 36 extends outwardly from the sliding bracket or C-shaped collar 32 and carries a dial indicator 37 which can be any of the well-known indicators used in squareness testing. Such indicators normally have an internal multiplying mechanism which actuates a visible pointer to give an indication of movement at the end of a feeler such as 38. Feeler 38 comprises a testing means end and is preferably positioned as shown in FIG. 1 to extend downwardly to the lowermost plane defined by the base plate 11 and onto a flat surface as well as upwardly of the gauge 10.

In use of the squareness and flatness gauge of this invention, the gauge 10 is trammed by placing base 11 on a known flat surface such as a granite plate 40 and setting bracket 32 as shown in dotted outline in FIG. 1. Handle 28 is then rotated to rotate shaft 21 and feeler end 38 over an arc of 180 degrees checking at least points 1, 2, and 3 sixty degrees apart, as shown in FIG. 2, on the flat surface of the granite plate 40. Leveling screws 14, 15, and 16 are suitably adjusted until the indicator shows that the vertical axis of shaft 21 is truly vertical. After this tramming step on the granite plate 40, the gauge 10 can be placed on any large flat surface and shaft 21 rotated over an arc of 180 degrees to the points shown in FIG. 2. If no movement of feeler 38 occurs when shaft 21 is rotated over the 180 degree arc, or the indicator 37 shows equal pressure at all points, the testing surface is flat while if the indicator shows variation or movement of the feeler 38, unevenness of the surface is indicated.

In testing squareness or perpendicularity of a work piece, such as a right angle iron 41, the work piece is placed on the known flat surface such as granite plate 40. The lower surface of the work piece shown at 42 rests directly on the flat surface and the testing means is moved upwardly and/or downwardly along the shaft 21 by loosening screw 34 to a point where the test bracket 32 will snugly slide along the shaft. Although the screw 34 is loosened, sufficient pressure is exerted on nylon block 35 to support the testing means by friction at any vertical position on the shaft. Variations in the flatness and the perpendicularity of the surface of the work piece 43 is thereby gauged by feeler 38 and indicated by indicator means 37.

While a specific embodiment of this invention has been shown and described, it should be understood that many variations thereof are possible. For example, the triangular shape of base plate 11 may vary so long as provision is made for swinging of the testing means about an arc of 180 degrees with the feeler 38 contacting a flat surface. While it is preferred to use a generally cylindrical shape for the shaft 21 in order to accurately position bearing blocks 22 and 23, the shaft may have other configurations. The particular sliding bracket used for the test means 31 may also vary. In all cases the feeler 38 is capable of touching a flat base surface upon rotation about the axis of the shaft, as by movement of the test means along with the shaft, and also extends outwardly of the gauge 10 for use as a squareness tester.

This invention is to be limited only by spirit and scope of the appended claims.

What is claimed is:

1. An inclination and flatness gauge comprising a base defining a lowermost plane,
    an upwardly extending support mounted on said base,
    an upwardly extending elongated shaft mounted on said support, said support having axially spaced bearings for rotatably mounting said shaft about its longitudinal axis,
    testing means mounted on said shaft for reciprocal movement along said shaft,
    means interconnecting said base and said support for enabling perpendicular alignment of said shaft with respect to said plane of said base,
    said testing means comprising an end mounted for rotation with said shaft about said axis and extending in one position to the lowermost plane for movement of said end over an arcuate path in said lowermost plane to tram said gauge.

2. An inclination and flatness gauge in accordance with claim 1 wherein said means interconnecting said support and said base comprises a plurality of spaced adjusting screws extending from said support to said base.

3. An inclination and flatness gauge in accordance with claim 1 and further comprising
    said testing means mounted on said shaft by a bracket, said bracket frictionally engaging said shaft at a flat wall provided on said shaft.

4. An inclination and flatness gauge in accordance with claim 1 wherein said shaft is mounted on said support for rotation about said axis by a pair of opposed conical bearing surfaces.

5. An inclination and flatness gauge in accordance with claim 1 wherein said base has triangular configuration and said support comprises a lower plate.

6. An inclination and flatness gauge comprising a base defining a lowermost plane,
    an upwardly extending support framt mounted on said base,
    an upwardly extending shaft having a flat side mounted on said support frame along an axis of said shaft,
    means defining spaced bearing points on said support frame for rotation of said shaft about its axis,
    testing means mounted on said shaft for reciprocal sliding movement along said shaft to said lowermost plane and for arcuate movement with said shaft upon rotation of said shaft,
    means interconnecting said base and said support frame comprising a plurality of spaced adjustment screws for enabling perpendicular alignment of said shaft with respect to said plane of said base,
    said testing means comprising a feeler and extending to said base plane in one position of said testing means.

7. An inclination and flatness gauge in accordance with claim 6 wherein said testing means is mounted on said shaft by an encircling bracket,
    said bracket frictionally engaging said shaft at said shaft flat side to permit sliding of said bracket axially of said shaft and prevent pivoting of bracket with respect to said shaft.

References Cited by the Examiner

UNITED STATES PATENTS

| | | | |
|---|---|---|---|
| 508,213 | 11/1893 | Fortin | 33—170 |
| 860,084 | 7/1907 | Evans | 33—171 |
| 1,196,981 | 9/1916 | Riebe | 33—147 |
| 1,515,867 | 11/1924 | Masone | 33—171 |
| 1,949,280 | 2/1934 | Lester | 33—170 |
| 2,469,904 | 5/1949 | Szuba | 248—1 X |
| 2,771,683 | 11/1956 | Kirehhof | 33—170 |
| 2,787,838 | 4/1957 | Tucker | 33—174 |
| 3,047,956 | 8/1962 | German | 33—174 |

FOREIGN PATENTS

| | | |
|---|---|---|
| 1,046,962 | 7/1953 | France. |
| 566,794 | 1/1945 | Great Britain. |

LEONARD FORMAN, *Primary Examiner.*

ISAAC LISANN, *Examiner.*

H. N. HAROIAN, *Assistant Examiner.*